US008775589B2

(12) United States Patent
Liss et al.

(10) Patent No.: US 8,775,589 B2
(45) Date of Patent: Jul. 8, 2014

(54) DISTRIBUTED NETWORK MANAGEMENT SYSTEM AND METHOD

(75) Inventors: Jonathan M. Liss, Marlboro, NJ (US); Nevton Cereja, Eatontown, NJ (US); Renata F. Bodner, Tinton Falls, NJ (US); Sameh A. Sabet, Freehold, NJ (US); Ricardo E. Alves, Ocean, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 348 days.

(21) Appl. No.: 12/031,954

(22) Filed: Feb. 15, 2008

(65) Prior Publication Data

US 2008/0201462 A1 Aug. 21, 2008

Related U.S. Application Data

(60) Provisional application No. 60/890,155, filed on Feb. 15, 2007.

(51) Int. Cl.
*G06F 15/16* (2006.01)
*H04L 12/24* (2006.01)
*H04L 29/08* (2006.01)

(52) U.S. Cl.
CPC ............ *H04L 41/00* (2013.01); *H04L 67/1051* (2013.01); *H04L 41/0654* (2013.01); *H04L 41/12* (2013.01)
USPC ............ 709/223; 709/210; 709/224; 709/249

(58) Field of Classification Search
CPC .................................................. H04L 67/1051
USPC ........................................................ 709/220
See application file for complete search history.

(56) References Cited

U.S. PATENT DOCUMENTS

| | | | | |
|---|---|---|---|---|
| 6,732,189 | B1 * | 5/2004 | Novaes | 709/249 |
| 6,785,726 | B1 * | 8/2004 | Freeman et al. | 709/227 |
| 6,993,686 | B1 | 1/2006 | Groenendaal et al. | |
| 7,409,432 | B1 * | 8/2008 | Recio et al. | 709/209 |

(Continued)

FOREIGN PATENT DOCUMENTS

| | | |
|---|---|---|
| CA | 2425442 A1 | 10/2004 |
| EP | 1594265 A1 | 11/2005 |

(Continued)

OTHER PUBLICATIONS

International Search Report and Written Opinion dated Jul. 25, 2008 issued in related International Patent Application No. PCT/US08/54100.

(Continued)

*Primary Examiner* — Andrew Goldberg

(57) ABSTRACT

A system and method for method of managing a network. Each of a plurality of servers includes an element management system (EMS) function for managing network elements within the network and a network management system (NMS) function for managing ones of the plurality of servers running the EMS function. An NMS function is activated on one of the servers when the plurality of servers shares a one network domain. When the network domain is divided into multiple domains, e.g. by a network failure, an NMS function is activated on at least one other one of the plurality of servers whereby each of the multiple network domains has at least one associated active NMS function.

19 Claims, 13 Drawing Sheets

(56) References Cited

U.S. PATENT DOCUMENTS

| | | | |
|---|---|---|---|
| 2002/0042693 A1* | 4/2002 | Kampe et al. | 702/186 |
| 2002/0055989 A1* | 5/2002 | Stringer-Calvert et al. | 709/220 |
| 2003/0069953 A1 | 4/2003 | Bottom et al. | |
| 2003/0202645 A1* | 10/2003 | Naik et al. | 379/201.1 |
| 2004/0010538 A1* | 1/2004 | Miller et al. | 709/201 |
| 2004/0153533 A1 | 8/2004 | Lewis | |
| 2004/0221149 A1* | 11/2004 | Rao et al. | 713/2 |
| 2005/0198247 A1 | 9/2005 | Perry et al. | |
| 2005/0259571 A1 | 11/2005 | Battou | |
| 2005/0262232 A1 | 11/2005 | Cuervo et al. | |
| 2006/0020686 A1* | 1/2006 | Liss et al. | 709/219 |
| 2006/0222360 A1* | 10/2006 | Gumaste et al. | 398/5 |
| 2007/0299946 A1* | 12/2007 | El-Damhougy | 709/223 |

FOREIGN PATENT DOCUMENTS

| | | |
|---|---|---|
| EP | 1734694 A1 | 12/2006 |
| JP | 2000010949 A | 1/2000 |
| JP | 3577025 B2 | 10/2004 |
| JP | 3887130 B2 | 12/2006 |

OTHER PUBLICATIONS

Supplementary European Search Report dated Mar. 1, 2013 issued in related European Patent Application No. 08729986.3.

* cited by examiner

US 8,775,589 B2

DISTRIBUTED NETWORK MANAGEMENT SYSTEM AND METHOD

CROSS-REFERENCE TO RELATED APPLICATIONS

This application claims the benefit of U.S. Provisional Application 60/890,155, filed Feb. 15, 2007, which is hereby incorporated herein by reference in its entirety

TECHNICAL FIELD

The present disclosure relates to network management, and, in particular, to a distributed network management system.

BACKGROUND

Network management may be conducted at different levels in various types of networks to avoid network failures and to assure network performance. In a communication network, an element management system (EMS) may be used to supervise and manage network elements within a network. A communication network may also include a network management system (NMS) to manage the overall network by communicating with several EMSs.

In an optical communication system such as a wavelength division multiplexed (WDM) system, for example, terminal or cable stations may be interconnected by cable segments to form a network. The network elements in an optical communication system may include equipment located at a cable station (e.g., terminal equipment and power feed equipment) as well as equipment connected to the cable station (e.g., repeaters and equalizers). In such a system, an EMS may be located at a cable station (or at a separate location) and used to manage the network elements associated with this cable station. The EMS may include one or more servers for performing the element management functions and one or more workstations for providing a user interface (e.g., to display the information associated with the network elements managed by the EMS). An NMS may be located at one of the cable stations or at a separate location for managing the overall optical communication system or network.

The management of a network may include configuration management, fault management and performance management. An EMS may provide fault management by retrieving, storing and/or displaying alarm, event and system messages forwarded by the network elements managed by the EMS. An EMS may provide performance management by retrieving, storing, displaying and/or measuring transmission quality data. A NMS can provide fault management and performance management for the entire network by managing all of the alarm, event and system messages and the transmission quality data forwarded by each EMS. The NMS may display fault and performance information received from each EMS, e.g. on a network topological map.

One type of information that may be displayed by an NMS is the network alarm status as managed by the underlying EMSs, as shown for example in FIG. 1. A user (e.g., a network administrator or operator) may monitor the displayed information to determine if the network alarms indicate failures in a network, which may cause network outages. Alarm summary information may indicate the level of alarm (e.g., major, minor, none, unavailable/not reporting), and the alarm count of major and minor alarms.

As shown in FIG. 2, alarm status information may be communicated between each EMS server 20 and an NMS 22 using a hierarchical approach. According to one implementation, one or more computers at the NMS may be configured as one or more servers (e.g., a single server or redundant servers) that receive information from EMS servers 20. The NMS may then display the alarm summary information for every EMS in the network (e.g., as shown in FIG. 1).

According to another possible implementation, a NMS may be formed without a physical NMS server or layer by distributing the NMS functionality to the EMS servers (i.e., a mini-NMS feature built into each EMS). With a distributed NMS that does not have a NMS layer, however, it is still desirable to provide a summary view of the status of the complete network. To accomplish this, each EMS may communicate with a single "master" server by presenting the highest level alarm status to the "master" server. In turn, the "master" server may provide to each EMS server a consolidated view of the alarm status for all of the EMS servers throughout the network. The alarm summary information of every EMS in the network (e.g., as shown in FIG. 1) may then be displayed on the EMS workstations. Thus, this distributed NMS approach also uses a hierarchical approach, i.e., with a master EMS server instead of a NMS server.

System operation in a hierarchical approach is heavily dependent upon the NMS server or the master server, which bears the brunt of processing and may be a single point of failure. If the NMS server or the master server fails, or if there is a network fiber break, the alarm and status sharing feature may fail. Also, the simple TCP/IP client/server based communication model available for distributed NMS systems can be inefficient and may require processing and transmission resources.

BRIEF DESCRIPTION OF THE DRAWINGS

These and other features and advantages consistent with the present disclosure will be better understood by reading the following detailed description, taken together with the drawings wherein.

DETAILED DESCRIPTION

In general, a distributed network management system consistent with the present disclosure may include NMS functionality at each hardware server in a network. Each hardware server may also include EMS functionality. As used herein, a hardware server including NMS functionality and EMS functionality may be referred to as a EMS-NMS server. When the complete network domain is functional, one of the servers may be assigned to hosting the NMS function for the domain while it and other servers may perform EMS-type functionality. If the host server becomes unavailable, any of the other servers in the network may be assigned to assume the host role. Also, in the event of a network failure, e.g., a network fiber break, separate host servers may be automatically assigned, i.e. without operator intervention, for performing the NMS functions on any separately created network "islands" or domains. In one example, the original host NMS may be assigned as the host for a first one of the islands, while a new NMS host is assigned as the host for a second one of the islands. When the network failure is remedied, the domains or "islands" may automatically collapse, i.e. without operator intervention, and NMS functionality may be automatically assigned on one of the servers, e.g., the original host server.

According to exemplary embodiments described herein, each EMS-NMS server may share network information with each other EMS-NMS server using a data communications network (DCN). As used herein, the term server refers to software and/or hardware that manages network resources and is not limited to a single computer or device. In one example, the network status data includes EMS alarm status data representing alarms forwarded to the EMS-NMS by network elements being managed by the EMS-NMS. In addition to alarm status, the network status data may include other types of information to be shared between EMS-NMSs such as the state of line monitoring equipment or other status data. The present disclosure is not limited, however, to alarm status data or EMS-NMS status data. Network status data, as used herein, may include any type of data relating to the status of a network in general and/or one or more specific network elements in the network. Some of the shared network status data (e.g., the summary alarm information) may be displayed using a user interface, for example, using a graphical user interface (GUI) on a client workstation logged into the host EMS-NMS server.

Figure 1:
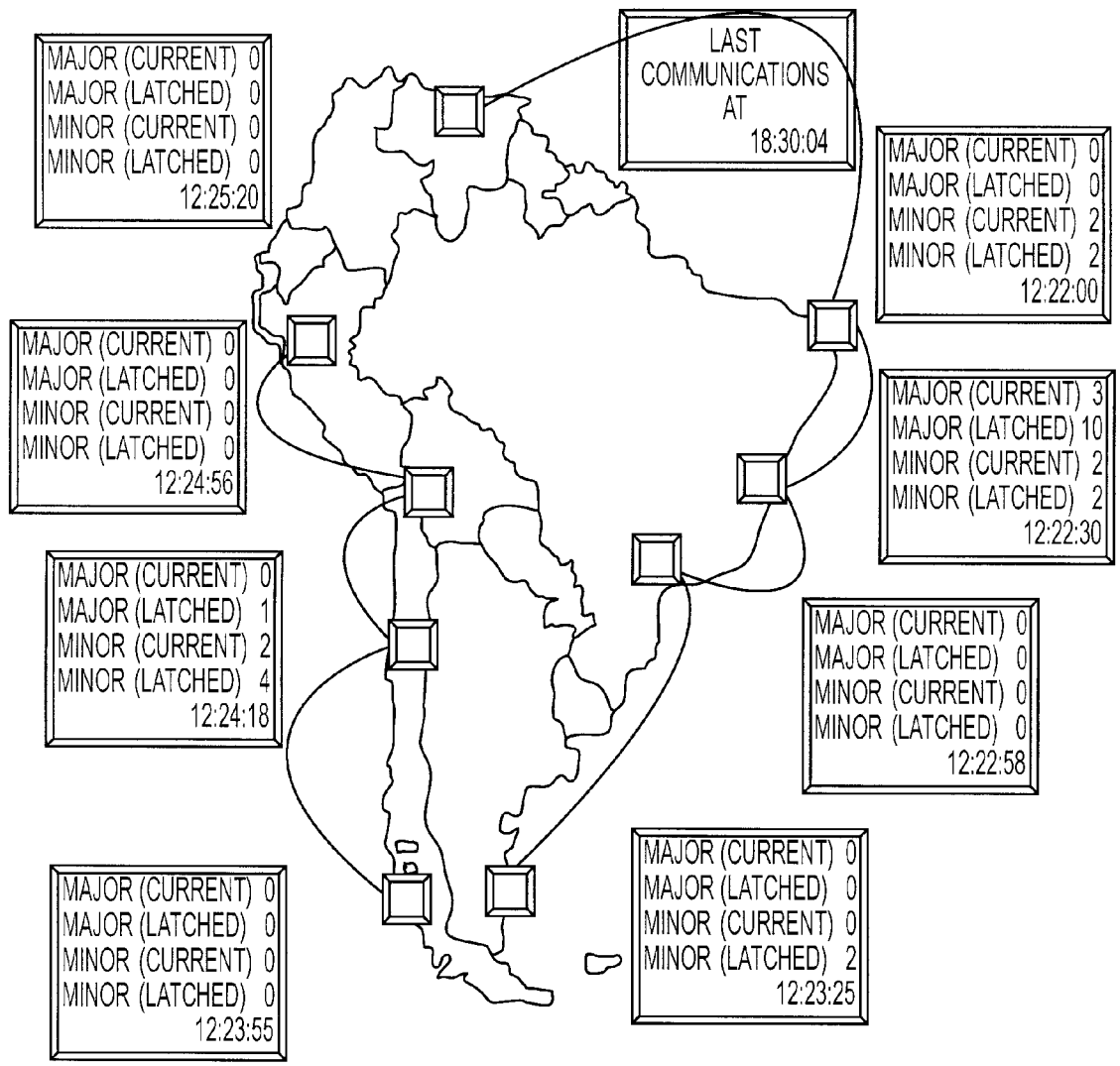
FIG. 1 is an illustration of a graphical user interface (GUI) report for a network management system (NMS).
Figure 2:
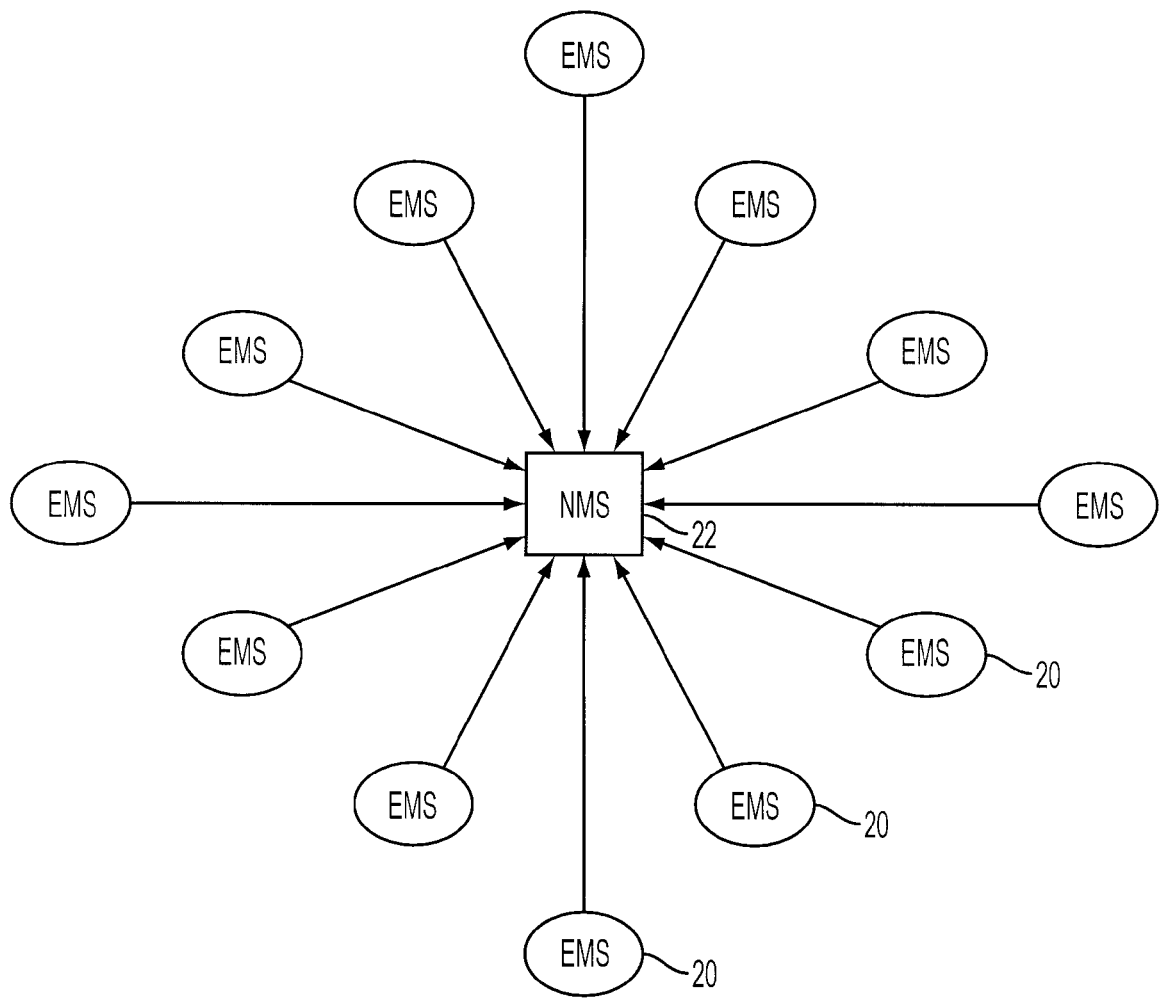
FIG. 2 is a schematic diagram illustrating a hierarchical approach to sharing data between element management systems (EMSs) and a NMS.
Figure 3:
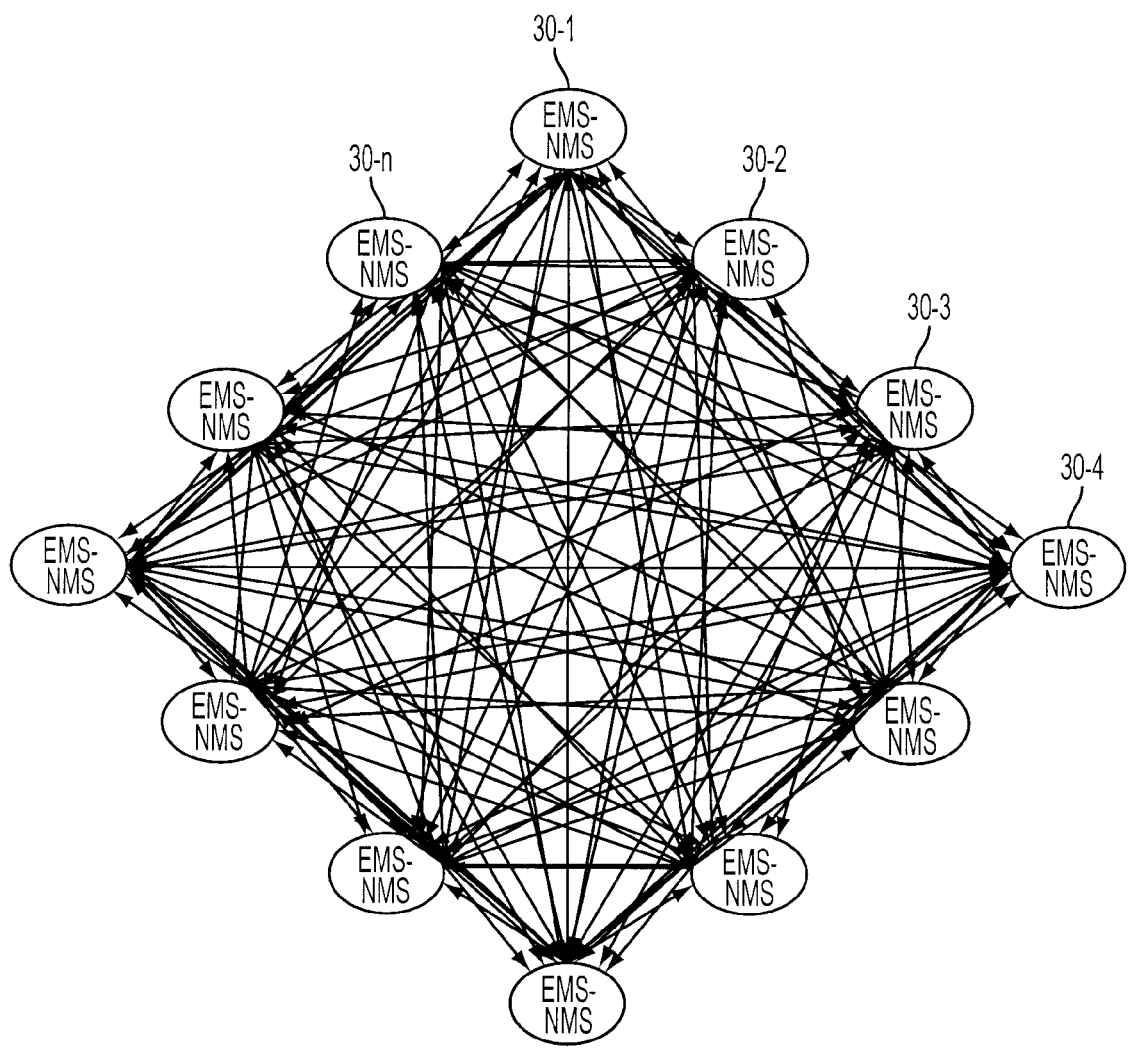
FIG. 3 is a schematic diagram illustrating a distributed network management approach using EMS-NMSs consistent with the present disclosure.

Referring to FIG. 3, EMS-NMS servers 30-1 . . . 30-n share network status data between the EMS-NMS servers 30-1 . . . 30-n. Each of the EMS-NMS servers 30-1 . . . 30-n in the network may transmit and receive messages or notifications indicating network status data associated with all of the EMS-NMS servers. The EMS-NMS servers may transmit the messages to other registered EMS-NMS servers, for example, using a star/broadcast method in which the EMS-NMS servers broadcast messages to the other servers or using a circular message queue (CMQ) method in which the EMS-NMS servers 30-1 . . . 30-n transmit messages to neighboring servers. Additional messages and/or notifications may be transmitted to determine if one or more of the EMS-NMS servers 30-1 . . . 30-n are not reporting or unavailable, for example, because the server is down or a DCN link is down.

One of the EMS-NMS servers, e.g., server 30-1 may be assigned as the host server for performing NMS functions. This assignment may be made discretely or automatically, e.g., through use of lookup tables at a client server. If the host EMS-NMS server fails, any of the other servers, e.g., 30-2 . . . 30-n, may be automatically assigned as the host server.

Figure 4:
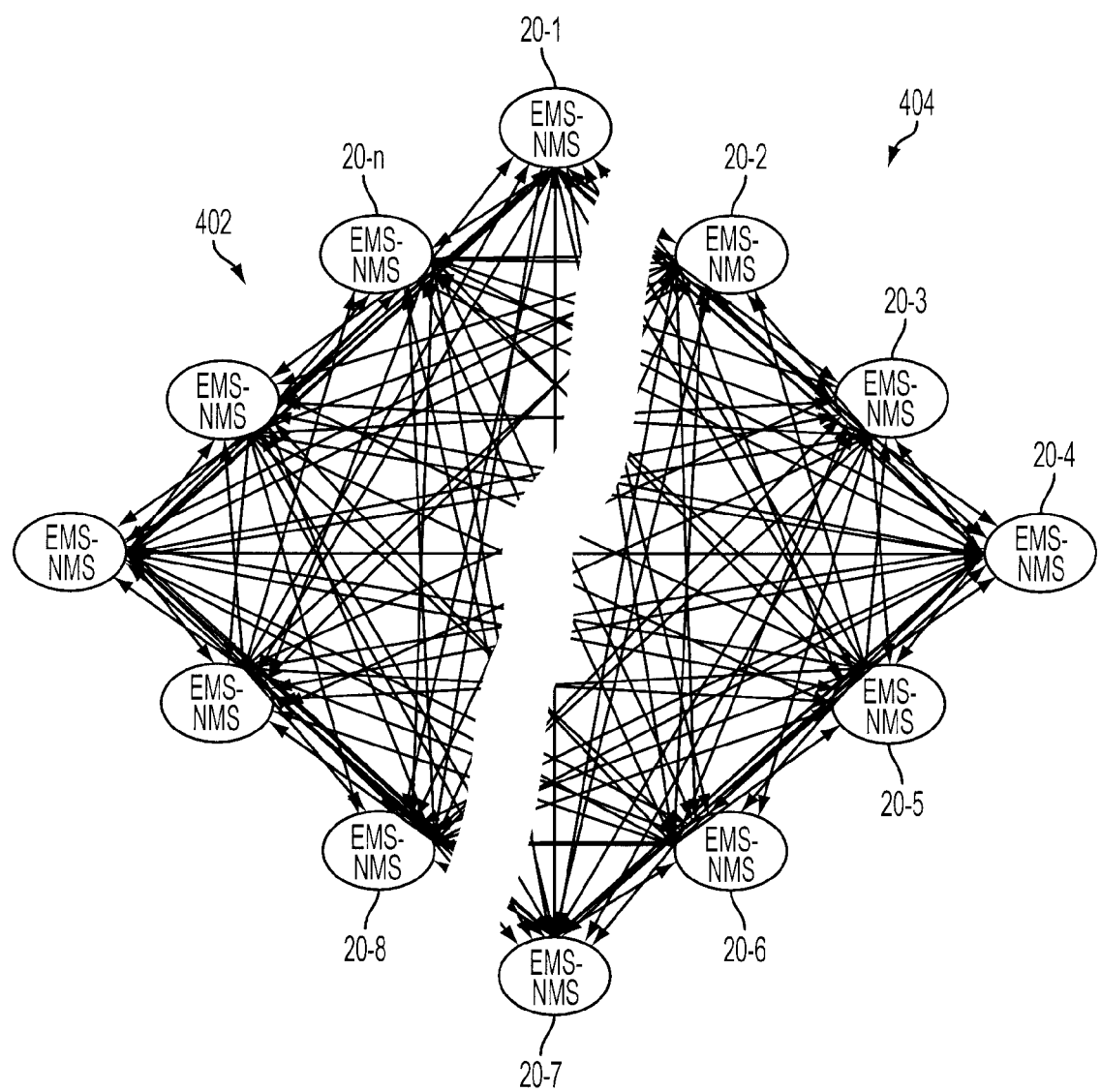
FIG. 4 is a schematic diagram illustrating a distributed network management approach using EMS-NMSs (comment as above) consistent with the present disclosure in the event of a network failure.

In the event that the network is separated into separate domains or islands, a EMS-NMS server may be assigned as a host server for each of the separate domains, i.e., multiple host servers with one host server per domain. As shown in FIG. 4, a network failure, such as a DCN fiber break, may cause separation of the network into separate domains 402, 404. The separate domains 402, 404 may be isolated, i.e., may be unable to communicate with each other. In the illustrated embodiment, for example, the servers 30-1 and 30-8 . . . 30-n may be separated into a first domain 402, and the servers 30-2 . . . 30-7 may be separated into a second domain 404. As a result of the network failure the EMS-NMS servers in a domain, e.g., first domain 402, may be unable to communicate with the servers in the other domain, e.g., second domain 404, but communication between servers within each domain may survive.

In a system consistent with the present disclosure, the creation of separate domains may result in the automatic assignment of a host-server for each domain, e.g., using lookup tables at a client server or local host server rules. For example, server 30-2 may be assigned as the host EMS-NMS server for the domain 404 and the server 30-1 may be assigned as the host server for the domain 402. When the network failure is remedied and the network domains or "islands" collapse, host-servers for the separate islands may yield host-server status to an automatically assigned host-server, e.g., server 30-1, for the repaired network.

Figure 5:
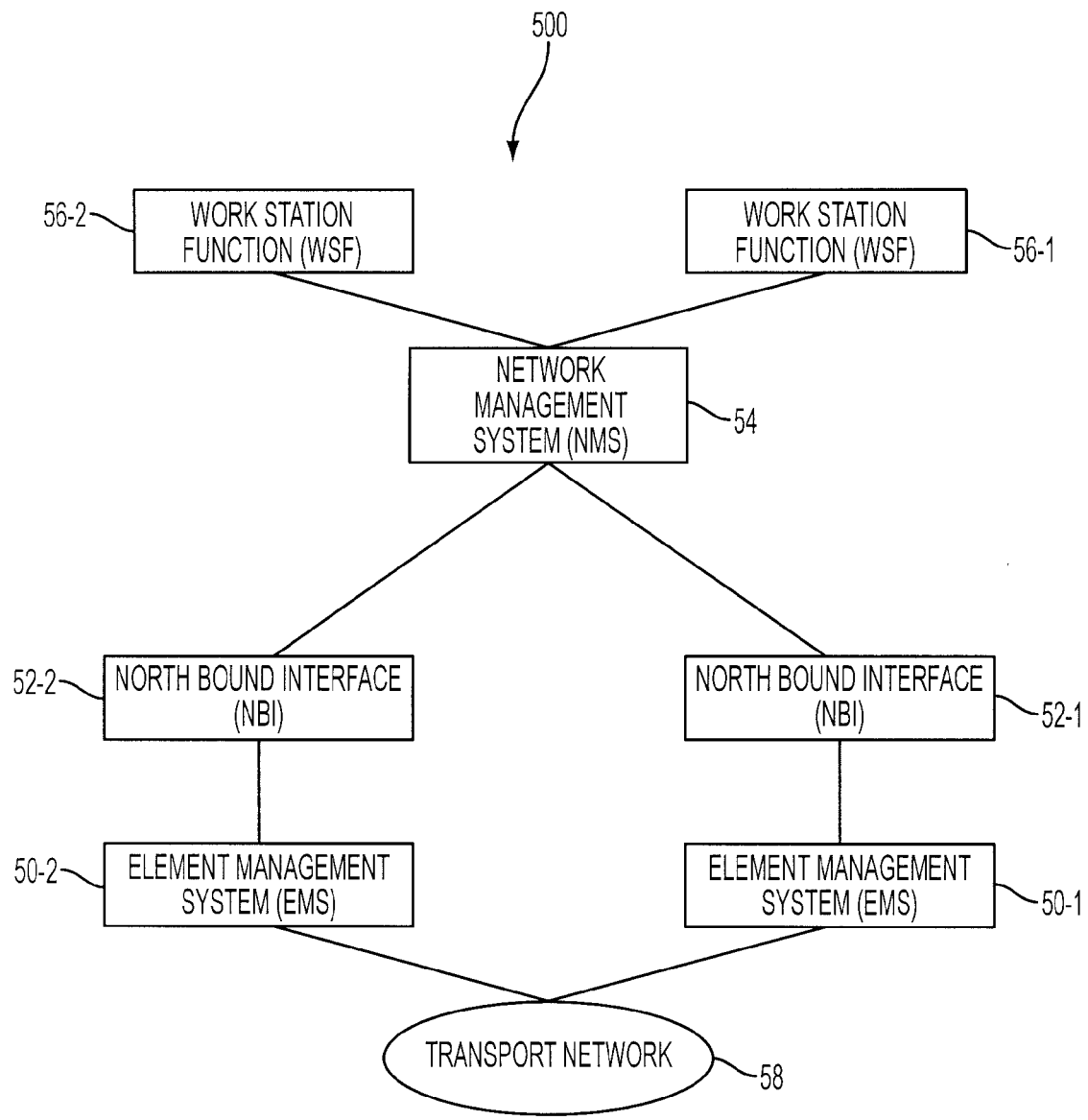
FIG. 5 is an embodiment of a logical high level architecture of a portion of a distributed network management system consistent with the present disclosure

FIG. 5 depicts an embodiment of a logical high level architecture 500 of a portion of a distributed network management system consistent with the present disclosure. The logical architecture 500 may include one or more element management system functionalities (EMSs), e.g., EMS 50-1, EMS 50-2. Each EMS functionality may be resident on a EMS-NMS hardware server. The EMSs' functionality may include managing transport network 58 components. Transport network components may include line termination equipment, power feed equipment, cables (e.g., undersea cables) and/or other equipment.

The EMS s' functionality may further include communication with a network management system function (NMS), e.g., NMS 54. The NMS function may be resident on a EMS-NMS hardware server. The NMS 54 may communicate with an underlying EMS, e.g., EMS 50-1, EMS 50-2, via northbound interface, e.g., NBI 52-1, NBI 52-2. In an embodiment, the northbound interface may be a CORBA (Common Object Request Broker Architecture) northbound interface. A CORBA northbound interface may provide for communication between distributed applications, i.e., that may be running on different computers and that may not share the same operating system. Further, the applications may be implemented using different programming languages. In another embodiment, the northbound interface may be an SNMP (Simple Network Management Protocol) interface. In another embodiment, the northbound interface may be a TL1 (Transaction Language 1) interface.

The NMS 54 may further communicate with a client workstation function (WSF), e.g., WSF 56-1, WSF 56-2. The WSF may be resident on a workstation. The workstation may be collocated with a EMS-NMS hardware server, e.g., at a cable station. Additionally or alternatively, the workstation may be stand-alone, e.g., at a customer site such as a NOC (Network Operations Center). The WSF may include a graphical user interface (GUI). The status of a distributed network may be displayed to a user via the WSF GUI. Network management information may be displayed to a user via the WSF GUI. The user may use the WSF GUI to request status and/or to prompt rediscovery of a network, for example.

As noted above, an NMS function, e.g., NMS 54, an EMS function, e.g., EMS 50-1, and an NBI, e.g., NBI 52-1, may be co-resident in a hardware server (EMS-NMS server). A WSF, e.g., WSF 56-1, may be resident in a workstation that may be collocated with the EMS-NMS server. In some embodiments, no more than one NMS function per network domain may be actively managing that domain at a given point in time. The NMS function may therefore include functionality to ensure that no more than one NMS function is actively managing a domain. The NMS function may further include functionality to allow activation of another NMS function in the event of an island-causing network fault, and/or hardware server fault and/or failure of an NMS function that is actively managing a network. The NMS function may include functionality to support deactivation of an additional NMS function upon repair of the island-causing network fault.

Figure 6:
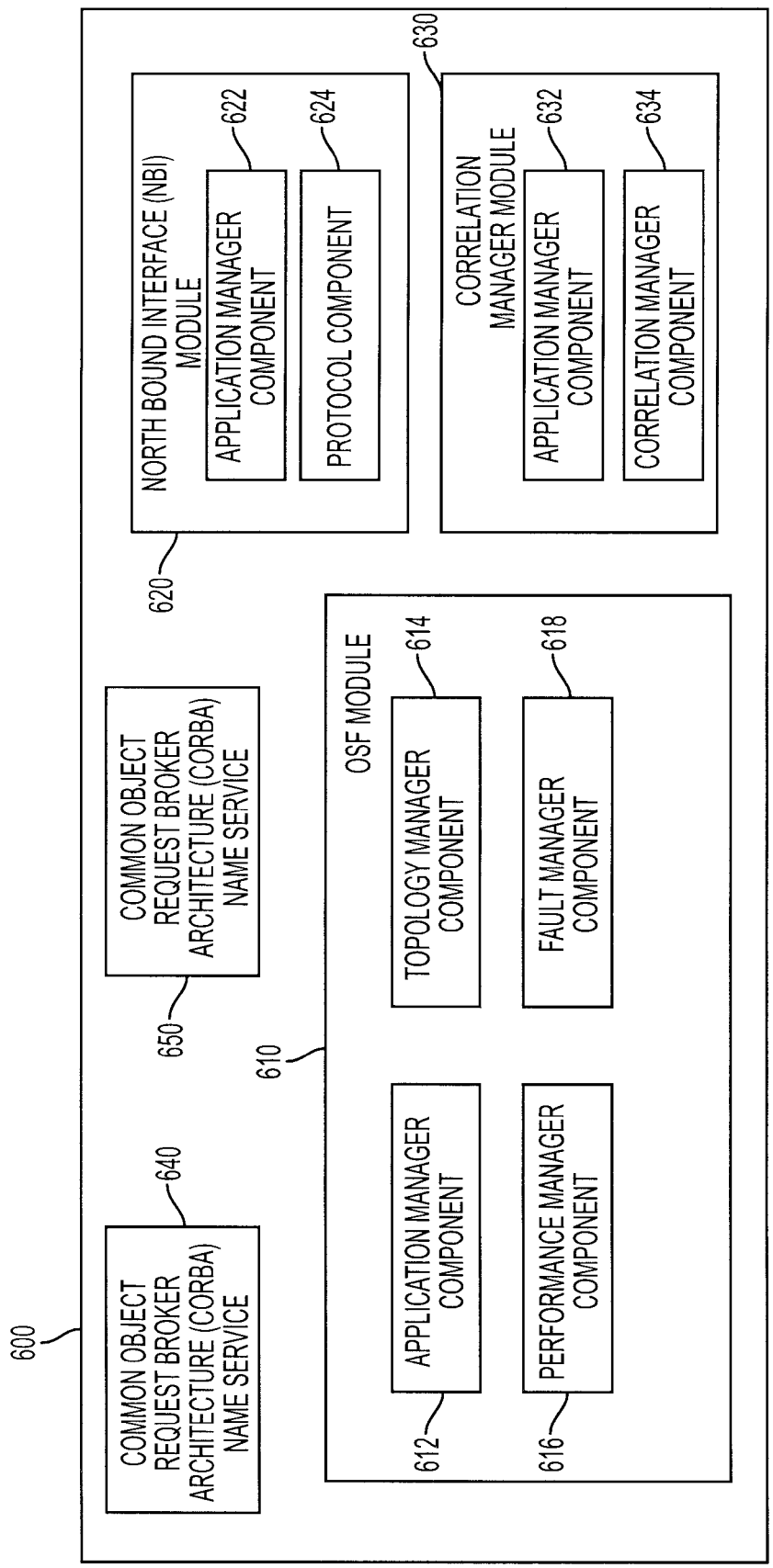
FIG. 6 is an embodiment of a network management system function consistent with the present disclosure.

FIG. 6 depicts an embodiment of an NMS function 600 consistent with the present disclosure. The NMS function 600 may include one or more modules. Each module may be an independent runtime process and may include one or more application components. Each application component may be specialized to perform a specific management function, e.g., implementing a specialized CORBA servant. As used herein, a CORBA servant may include a data structure or object in a programming language that is used to implement the functionality of a CORBA object.

The NMS function 600 may include an OSF (Operations Support Function) Module 610, an NBI (Northbound Interface) Module 620, a Correlation Manager Module 630, a CORBA Name Service 640 and a CORBA Event Service 650. Each module 610, 620, 630 may have an associated application manager component 612, 622, 632, respectively. The OSF Module 610 may further include a Topology Manager Component 614, a Performance Manager Component 616, and a Fault Manager Component 618. The NBI Module 620 may further include a Protocol Component 624. The Correlation Manager Module 630 may further include a Correlation Manager Component 634. Each module 610, 620, 630 may publish its CORBA servant object reference into the CORBA Name Service 640 and may send and/or receive autonomous notification messages via the CORBA Event Service 650. A module's life cycle may be controlled by its associated application manager component and its other components may be activated and/or deactivated accordingly.

The OSF Module 610 may be executed independently of any other module in the NMS function 600. The OSF Module Application Manager Component 612 may control the runtime behavior of the NMS function 600. For example, the OSF Module Application Manager Component 612 may determine whether a client may be actively supported.

Figure 7:
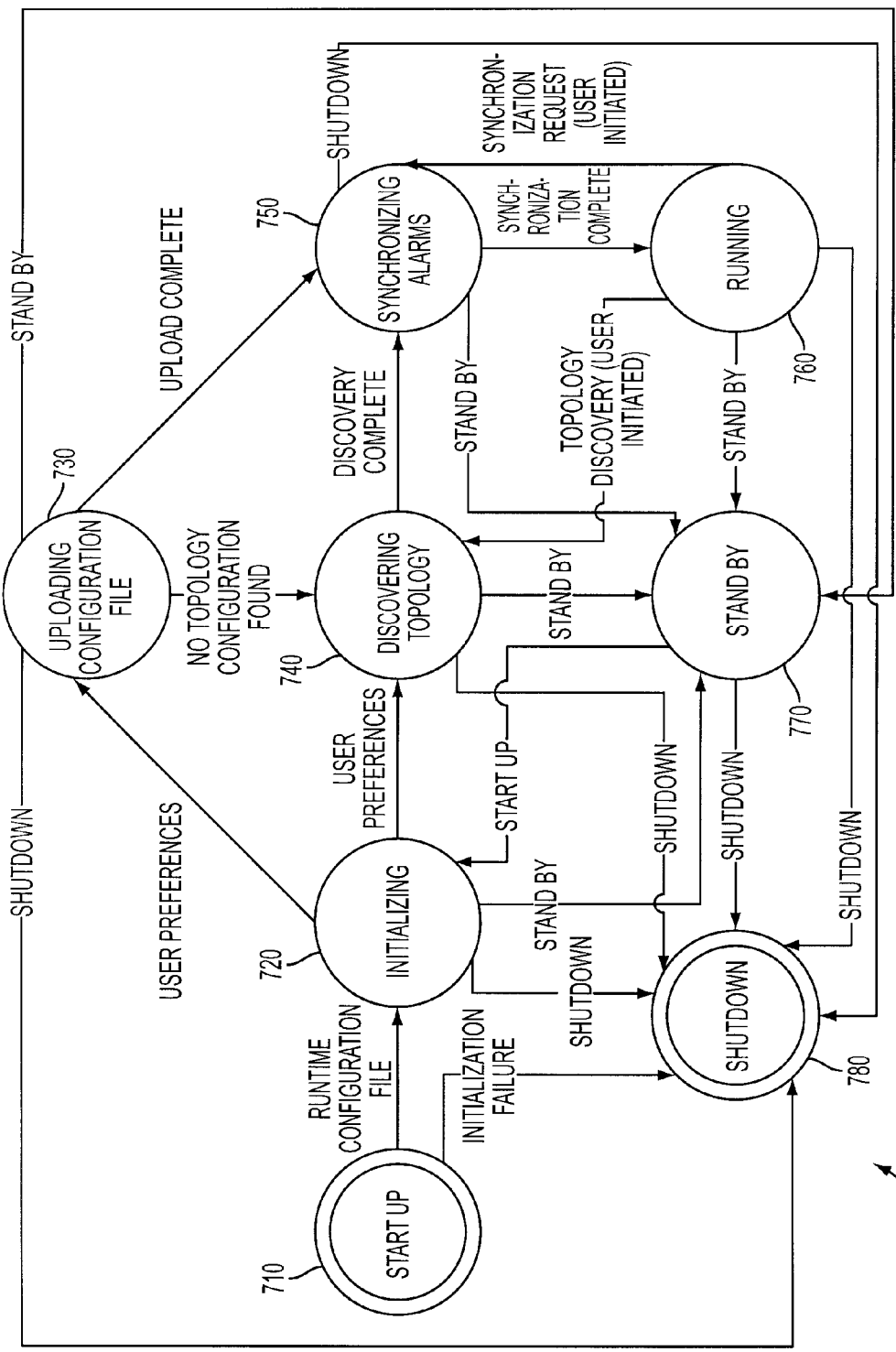
FIG. 7 is an embodiment of a state transition diagram of a NMS server application consistent with the present disclosure.

FIG. 7 illustrates an embodiment of a state transition diagram 700 of an OSF Module Application Manager Component ("Server Application") consistent with the present disclosure. The state transition diagram 700 includes states and state transitions. A state may include one or more tasks that a Server Application performs. A state may further identify which services that a Server Application can support at that state. For example, services may include runtime status checks when requested by a user (e.g., via a WSF GUI). State transitions may be governed by milestones reached in an application manager component execution, self-sanity checking operations and/or user-issued requests. State transitions may be inter- and/or intra-state and may be notified to client applications via autonomous messages.

Upon Start Up 710, the Server Application may first check the availability of local resources that it may need for its initialization. The Server Application may also check the availability of runtime support for the features it provides. In other words, the Server Application may verify that its runtime environment is properly configured and that resources are available for a server session to be initiated. For example, the Server Application may verify the availability of application configuration files, server configuration, and/or system resources. If the local resources and/or runtime support are available, the Server Application may transit to an Initializing state 720. Otherwise, the Server Application may log appropriate messages (e.g., initialization failure) and may transit to a Shutdown state 780.

When in the Initializing state 720, the Server Application may process its runtime configuration file, which may define the Server Application behavior at runtime and may govern the steps the Server Application will follow. In an embodiment, the runtime configuration file may determine whether the Server Application will perform a cable system topology discovery or process a previously created network topology configuration file. The Server Application may further determine whether to automatically overwrite a topology configuration file, if existing, after a topology discovery is performed. In another embodiment, the runtime configuration file may determine whether the Server Application may co-exist with other server application instances and the Server Application's instance activation priority state. In another embodiment, the runtime configuration file may include a time interval for server application conflict detection and may indicate whether other server hosts (i.e., EMS-NMS hardware servers or EMS or NMS software servers) may be available.

At the Initializing state 720, the Server Application may service client user requests concerning its runtime status. The Server Application may transit into this state, from a Standby state 770, for example, in response to a user request, e.g., user-issued activate request. The Server Application may also transit into the Initializing state 720 from the Start Up state 710 (i.e., resources may be available for initializing and/or runtime support).

The Server Application may perform one or more tasks in the Initializing state 720. The tasks may include creating and registering a server application servant using, for example, a CORBA Name Service (e.g., CORBA Name Service 640). The tasks may further include creating event channels for autonomous messages using, for example, a CORBA Event Service (e.g., CORBA Event Service 650). In an embodiment, the tasks may include detecting and preventing conflict with other possibly active server applications (i.e., other NMS functions). The tasks may further include ensuring synchronization of user-defined application configurations. The tasks may further include detecting and triggering an appropriate topology upload option.

For example, detecting server conflict may result in no server conflict detected or server conflict detected. If no server conflict is detected, the Server Application may transit to a next appropriate state. The next appropriate state may be determined according to the Server Application's runtime configuration file. For example, the Server Application may transit to an Uploading Configuration File state 730 or a Discovering Topology state 740.

If a server conflict is detected and a conflicting server cannot be contacted, the Server Application may transit to a next appropriate state. The next appropriate state may be determined according to the Server Application's runtime configuration file. For example, the Server Application may transit to the Uploading Configuration File state 730 or the Discovering Topology state 740. For example, if a DCN fault occurred local to the Server Application, then the Server Application may be isolated. In this case, the Server Application may be unable to contact another, potentially conflicting, NMS instance. Repairing the DCN fault may remedy this situation.

If a conflict is detected and the conflicting server can be contacted, then the following scenarios may occur. If the conflicting server has higher activation precedence over the initializing Server Application instance, the Server Application may log the appropriate messages and transit to the Stand By state 770. If the conflicting server has lower activation precedence relative to the initializing Server Application instance, the Server Application may proceed to a next appropriate state, according to its runtime configuration file. If the conflicting server has the same activation precedence as the initializing Server Application instance then if the activation priority level of the initializing Server Application is higher then the activation priority level of the conflicting server then the Server Application may proceed to the next appropriate state, according to its runtime configuration file. Otherwise, the Server Application may log the appropriate message and transit to Stand By state 770. The activation precedence may be based on the runtime status checking and conflict detection protocol, discussed in more detail below.

The Server Application may transit out of the Initializing state 720 as follows. The Server Application may transit to the Uploading Configuration File state 730 and/or the Discovering Topology state 740, upon completion, depending on its runtime configuration file. The Server Application may transit to the Stand By state 770 as a result of server conflict detection and/or in response to a client-issued Stand By request. The Server Application may transit to Shutdown 780 in response to a Shutdown request. The user requests that may be serviced during this state include runtime status check, server stand by, and/or server shutdown.

In the Stand By state 770, the Server Application may not be actively monitoring the network. If an activate request is received, the Server Application may transit to the Initializing state 720 and may proceed according to its runtime configuration. The Server Application may transit into the Stand By state 770 in response to a client-initiated request. For example, a user may issue a Stand By request using a WSF GUI, when system maintenance is being performed.

The Server Application may transit to the Stand By state 770 as a result of server conflict detection. For example, in a single server environment, a server conflict may be detected during the Initializing state 720 and/or during active network management (i.e., Running state 760). The Server Application may then self-impose a transit to the Stand By state 770, according to a NMS instance consolidation protocol (discussed in more detail below).

The Server Application may transit out of the Stand By state 770 to the Initializing state 720 in response to a client-issued activate request and/or to the Shutdown state 780 in response to a shutdown request. The user requests that may be serviced during the Stand By state 770 may include runtime status check, server activate, server stand by, and server shutdown.

In the Uploading Configuration File state 730, the Server Application may attempt to process a pre-existing topology configuration file and create network-managed entities based on its contents. The underlying EMS systems may only be contacted to provide updates to network configuration entities' runtime status. The Server Application may perform one or more tasks during the Uploading Configuration File state 730. The tasks may include creating managed elements, creating topology-related event channels and/or updating managed information. Abnormalities and/or exceptions that may occur during the performance of these tasks may be logged.

The Server Application may transit out of the Uploading Configuration File state 730 to a Synchronizing Alarms state 750 upon successful completion of a topology upload. The Server Application may transit to a Discovering Topology state 740, if the topology configuration cannot be uploaded.

The Server Application may transit out of the Uploading Configuration File state 730 to the Stand By state 770 in response to a client-issued stand by request and/or to the Shutdown state 780 in response to a shutdown request. The user requests that may be serviced during the Uploading Configuration File state 730 may include runtime status check, server stand by, and server shutdown.

In the Discovering Topology state 740, the Server Application may perform network topology discovery and/or may create the network-managed entities. The Server Application may rely on underlying NBI systems to provide the topology and up-to-date configuration information. The Server Application may perform one or more tasks during the Discovering Topology state 740. The tasks may include contacting a NBI cable system naming service (e.g., CORBA naming service 640), discovering system topology, creating managed elements, updating managed information, creating topology-related event channels, generating a topology configuration file according to the runtime configuration file and generating a trail trace for server applications, according to runtime configuration file. Abnormalities and exceptions that may occur may be notified to clients and logged to a dedicated file. Only successfully created network entities may be managed.

The Server Application may transit into the Discovering Topology state 740 in response to a client-initiated request, e.g., a WSF client issues a discovery topology request. The Server Application may transit into the Discovering Topology state 740 when the server is starting up and no server conflict has been detected. The Server Application may transit into the Discovering Topology state 740 from the Uploading Configuration File state 730 if uploading the topology information was unsuccessful.

The Server Application may transit out of the Discovering Topology state 740 to the Synchronizing Alarms state 750 upon the successful completion of the topology discovery. The Server Application may transit out of the Discovering Topology state 740 to the Stand By state 770 in response to a client-issued stand by request and/or to the Shutdown state 780 in response to a shutdown request. The user requests that may be serviced during the Discovering Topology state 740 may include runtime status check, server stand by, and server shutdown.

In the Synchronizing Alarms state 750, the Server Application may have discovered and uploaded the network topology. The Server Application may then clear the contents of an active alarm list. The Server Application may re-synchronize fault information with the underlying EMS systems via the NBI interface (e.g., NBIs 52-1, 52-2). The Server Application may perform one or more tasks during the Synchronizing Alarms state 750. The tasks may include cleaning up a current alarm list, connecting to EMS-created event channels, synchronizing alarms with underlying EMS and notifying clients (e.g., WSFs 56-1, 56-2) of non-responsive EMS NBI and event channels.

The Server Application may transit out of the Synchronizing Alarms state 750 to a Running state 760 upon the successful completion of the alarm synchronization. The Server Application may transit out of the Synchronizing Alarms state 750 to the Stand By state 770 in response to a client-issued stand by request and/or to the Shutdown state 780 in response to a shutdown request. The user requests that may be serviced during the Synchronizing Alarms state 750 may include runtime status check, server stand by, and server shutdown.

In the Running state 760, the Server Application may enable servicing client requests and/or may process incoming notifications received from underlying EMS systems. The incoming notifications may include alarm sets and alarm clears. The Server Application may perform one or more tasks during the Running state 760. The tasks may include listening to and/or processing autonomous messages, managing event channel connectivity, servicing client requests and sending a heart beat notification to clients.

A heart beat notification may be a periodic signal between a server (e.g., Server Application) and a client (e.g., WSF) indicating that the server is running. Before sending a heart beat notification, the Server Application may reset its runtime progress status. Upon receiving a heart beat notification, a client may issue a request for Server Application's runtime status. The Server Application may update its runtime progress status by incrementing its number of active clients for each runtime status request received.

The Server Application may transit out of the Running state 760 to a Discovering Topology state 740 in response to a client-issued request. The Server Application may transit out of the Running state 760 to the Synchronizing Alarms state 750 in response to a client-issued request. The Server Application may transit out of the Running state 760 to the Stand By state 770 in response to a client-issued stand by request and/or as a result of server conflict detection. The Server Application may transit out of the Running state 760 to the Shutdown state 780 in response to a shutdown request and/or as a result of server conflict detection. The user requests that may be serviced during the Running state 760 may include runtime status check, server stand by, and server shutdown.

When transiting out of the Running State 760 the Server Application may stop any running state-related periodic task that might have been scheduled and unconditionally release any outstanding resource locks it may have granted.

In the Shutdown state 780, the Server Application may no longer service client requests other than runtime status. Once initiated, the server shutdown procedure may not be interrupted and incoming notifications are discarded. When the Server Application is shutting down, it may disconnect from EMS event channels, deregister from the naming service, notify clients, close log files, and/or release server host system resources used by the Server Application.

During operation, a distributed network management system may function as follows. Upon start up, a client user (e.g., WSF 56-1) may attempt to connect to an existing active NMS instance. If none is found then the client may activate an NMS instance, by sending a start up request.

As noted above, an NMS function may be installed and configured in a EMS-NMS hardware server in every cable station within a cable system. Certain cable station EMS-NMS hardware servers may be chosen not to host an NMS server. Under normal conditions, at least one NMS instance may be active in the network, unless a user manually shuts down or sets every NMS instance to Stand By.

The server suite of a given network may be configured to support single or multiple NMS instances. When configured for multiple instances, the server application may disable its conflict detection protocol execution. When single instance mode is configured, the conflict detection protocol may be executed to enforce a single active NMS instance in the network. The protocol may be based on the server runtime status checking operation.

The runtime status check may allow NMS and WSF instances to request the runtime status of another NMS instance. Based on the results received, the NMS and WSF instances may decide their relationship with that NMS instance. WSF clients, for example, may decide whether to look up a different NMS instance. NMS instances may use the response to resolve instance activation conflicts at start up and upon DCN communication disruption restoration.

The runtime status may include three components: the server application's runtime state, its progress status, and its activation priority. The server application's runtime state may correspond to its life cycle (e.g., as shown in FIG. 7) state that the instance is currently executing. The life cycle states may include an order of precedence. For example, the order of precedence (highest to lowest) may be running, synchronizing alarms, discovering topology, uploading configuration file, initializing, standing by, and shutting down. WSFs may use the server application runtime state to determine whether an NMS instance is ready to service requests. WSFs may also use the application runtime state to determine how to control the server application's runtime behavior to ensure the WSF will be serviced by that NMS instance or another.

The server application's progress status may be the relative progress of the server application while executing in either the Initializing or Running states. Conflict resolution may be resolved in the Initializing and Running states. For example, during Initializing, progress status may indicate how many of the potential NMS servers have been contacted. This information may be used to detect and prevent server multiple instances, if the system has been configured to allow only one active server per domain. During the Running state, progress status may indicate how many WSF instances have registered to be supported by the NMS instance. As the conflict resolution protocol may be executed during Initializing and Running states, progress status may not be meaningful when reported in conjunction with other runtime states.

The server application's activation priority level may be a precedence indicator that may be determined upon system configuration. The activation priority level may be used to identify a preferred EMS-NMS hardware server to host the active NMS instance monitoring the network, when multiple NMS instances are not allowed. The Activation Priority definition may depend on network topology and resource availability.

The server application's Runtime Progress status and activation priority level may support a conflict detection protocol. The server application's runtime progress status and activation priority level may allow an NMS instance to compare its runtime state with the runtime states of other NMS instances. In an embodiment, the relative precedence of these attributes, in checking for runtime conflicts, may be configurable. For example, if runtime progress is set to a higher precedence than activation priority level, the NMS instance that has progressed further in the initialization process and/or which is servicing more clients may have precedence to remain active. This configuration may minimize overhead associated with a client that may be affected by an NMS instance de-activation (i.e., the NMS instance shutting down or going into Stand By mode). When the activation priority is set to higher precedence than runtime progress, the NMS instance with a higher activation priority may have precedence to remain or become active. The NMS instance with a lower precedence may proceed to a self-imposed de-activation.

Similar to other requests, a runtime status check may provide the server with a requester identification. The requester identification may contain its instance type (NMS or WSF) and its host, allowing the server to identify the requester. This information may be useful when detecting conflicts after DCN disruption.

A server runtime configuration file may determine whether multiple NMS instances may be simultaneously active in a network. Rather than enforcing multiple NMS instances, this mechanism may be used to ensure that only a single NMS instance is active, when so configured. Whether to allow multiple NMS instances may be determined at system configuration. Allowing multiple NMS instances may increase NMS availability but may also increase runtime overhead. The relative cost-benefit may be system dependent.

When a server starts, the NMS instance may attempt to manage the network and may move to the Initializing state. If multiple instances are allowed then the NMS instance may proceed through the application life cycle (e.g., as shown in FIG. 7) until it reaches the Running state, without checking for conflicts. If a single active NMS instance has been selected, then the server conflict detection protocol may be executed, as described in the following sections.

Conflict detection may occur during the Initializing state and/or the Running state. Potentially conflicting NMS instances may be indicated in a server's runtime configuration file. At the Initializing state, in order to detect active NMS instances, each NMS may contact each potential server host identified in its runtime configuration file, starting with a local server. At a local naming service, a NMS instance may publish itself and make itself available for client access (e.g., by a WSF instance).

Figure 8:
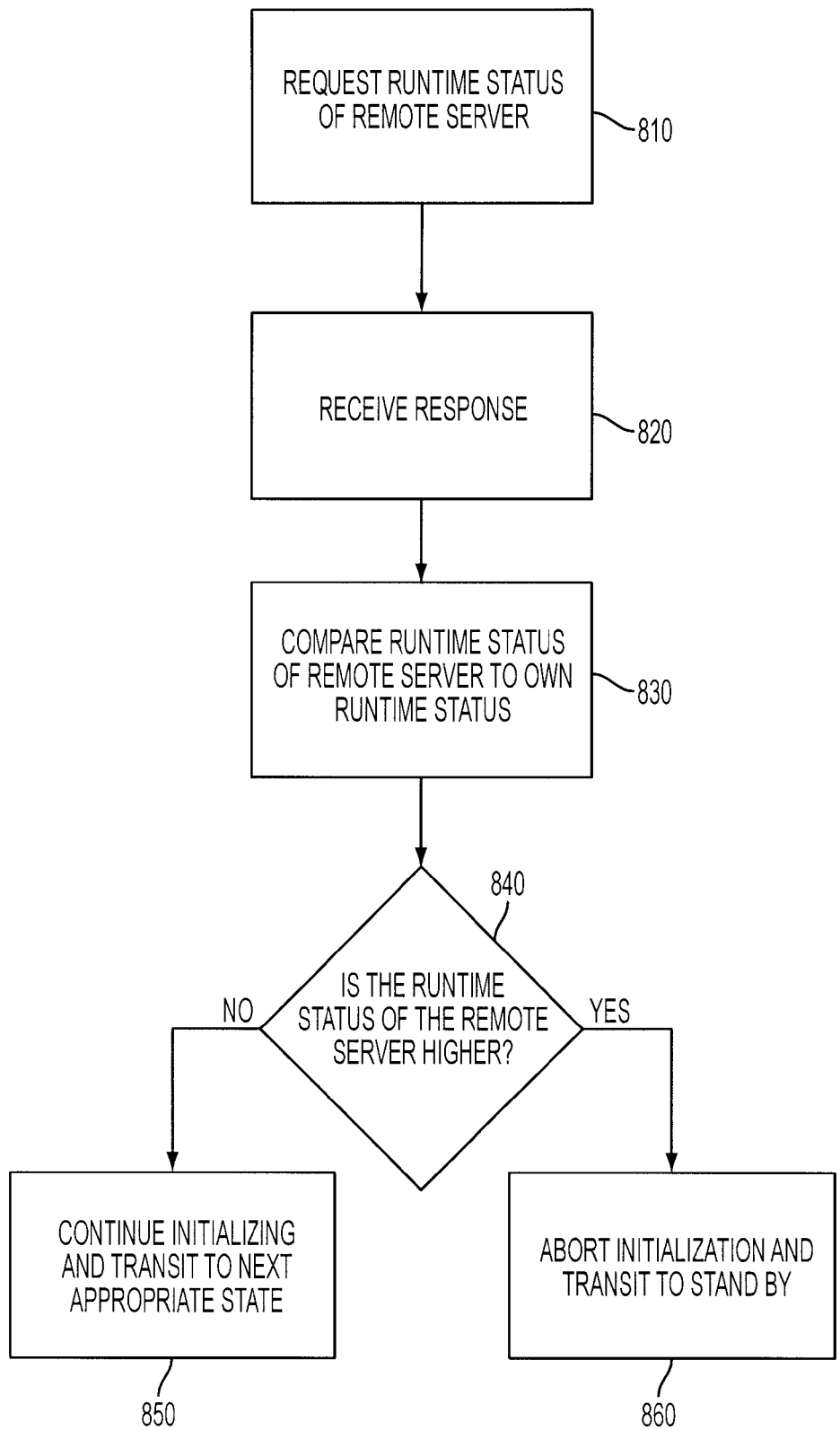
FIG. 8 is a flowchart illustrating checking the runtime status of another NMS server consistent with the present disclosure.

For example, referring to FIG. 8, if single NMS instance mode is selected, then the initializing server may contact a remote server and query its runtime status 810. The remote server may respond 820. The initializing server may compare the response to its own runtime status 830, to determine whether to proceed with its initialization process 850 or to transit to the Stand By state 860. If the remote NMS instance's runtime status has higher precedence than the runtime status of the local server, then the local server may abort its initialization and transit to Stand By state 860. Otherwise, the local server may proceed to become an active NMS instance 850. The server conflict detection mechanism, combined with a list of NMS servers, defined in the server runtime configuration file, may add flexibility to server deployment. For example, a set of preferred server hosts may be defined. Selection of a preferred server host may depend on network topology, resource availability, and runtime workload analysis and estimates.

During operation, a DCN (data communication network) may be disrupted due, for example, to a cable fault. A DCN disruption may create one or more distinct domains of EMS and/or WSF clients. While intradomain communication may exist, interdomain communication may be lost. Prior to the disruption, assuming no island-creating faults and assuming a single server configuration, one server may be actively managing the network. Upon the DCN disruption, network partitions may occur and the WSF instances isolated from the active server may activate one or more additional NMS instances. Accordingly, multiple NMS instances may become active simultaneously. The multiple NMS instances may not be in conflict if only one server is active per domain. When the DCN is restored, the multiple NMS instances may be in conflict, i.e., multiple active servers in a domain. In an embodiment, the active NMS instances may resolve such a conflict and consolidate to a single active server per domain.

The conflict resolution and consolidation may be achieved as follows. Each active server's runtime configuration file may contain a list of potential NMS servers. Each active (i.e., in the Running state) NMS server may periodically check the runtime status of each of the other potential NMS servers and accordingly move into Stand By state or not. Each NMS instance may cache the runtime status of every NMS server in the network. This information may initially be obtained when the NMS server is first started, as part of its initialization process.

Figure 9:
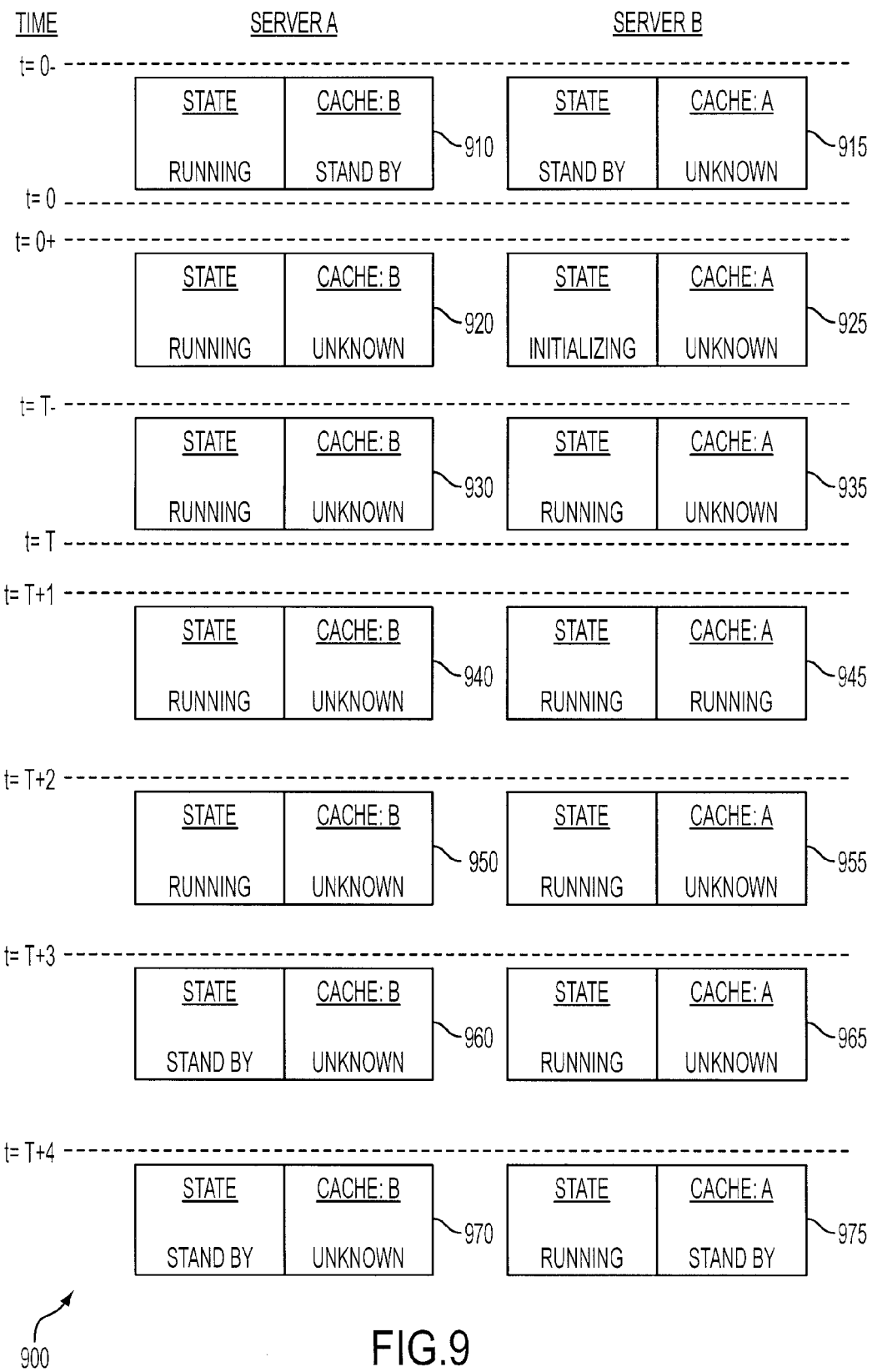
FIG. 9 is a timing/state diagram illustrating the activation and deactivation of an NMS server when a DCN fault occurs and is then repaired consistent with the present disclosure.

FIG. 9 depicts an exemplary timing diagram 900 indicating the states of two NMS servers (Server A and Server B) and the cached state of the other server (Server B and Server A, respectively). The states of the two NMS servers and their cache contents may change over time and in response to certain events, e.g., occurrence and/or resolution of a DCN island-creating fault. The time intervals shown in the diagram 900 are arbitrary and are for illustrative purposes. The diagram 900 includes only two NMS servers for simplicity. The functionality described may be applicable to any number of NMS servers.

For example, at cable system start up, an active server may eventually request the runtime status all other NMS instances. NMS instances that may be already executing and successfully contacted will be in either Initializing, Stand By, or Shutdown states. The active server may set the runtime state of any NMS instances not successfully contacted to an Unknown state. For every runtime status request received, the server receiving the request may update its cached runtime status of the requester server, setting it to Unknown.

Referring to FIG. 9, at time t=0−, Server A may be in a Running state 910 and Server B may be in a Stand By state 915. Servers A and B may be in the same domain, i.e., no island-creating faults between Server A and Server B. At some point in time, prior to t=0−, Server A may have successfully requested Server B's runtime state. Server B's cache may indicate that A's runtime state is Unknown 915, as a result of Server A requesting Server B's runtime state. While Server B is in the Stand By state, Server B may not request Server A's runtime status. Server A's cache may indicate that Server B's runtime status is Stand By 910.

In a stable system, all non-active NMS instances may eventually be in a Stand By state. NMS instances in the Stand By state may not request runtime status of the active server. The active server cache memory may contain data indicating the runtime status of the other servers. Since the servers that are in the Stand By state may not request the runtime status of the active server, their runtime states in the active server cache may not change. Therefore, the active server may not request further other server runtime status, eliminating additional communication overhead.

For example, if a DCN disruption occurs, then one or more NMS instances may be activated and may reach the Running state. An active NMS instance (e.g., server A) may not be successfully contacted by the newly activated server (e.g., server B). If server A was successfully contacted by server B, then server B may not be activated, i.e., server A and server B would be in the same domain. Since server B may not successfully contact server A, server A's runtime status in server B's cached information may be set to Unknown.

Referring again to FIG. 9, at time t=0, a DCN fault has occurred. As a result of this fault, Server A and Server B may no longer be able to communicate. Server A and Server B may be in separate domains and/or islands. At time t=0+, Server B may have received a request to activate from a WSF, for example. Accordingly, Server B may be in an Initializing state 925. Server B may unsuccessfully request Server A's status, and may therefore set Server A's runtime status in Server B's cache to Unknown 925 and Server B may proceed with its initializing functions. Server A may remain in the Running state 920. Between time t=0 and time t=0+, Server A may request Server B's runtime status. As a result of the DCN fault, Server B may not respond to Server A, so Server B's runtime status in Server A's cache may also be set to Unknown 920. At time t=T−, Server B may transit to Running state 935. Server A may remain in the Running state 930. Without communication between Server A and Server B, Server A's and Server B's respective caches may indicate that the other server's state is Unknown 930, 935.

Periodically, Server B may request server A's runtime status. At time t=T, for example, DCN connectivity may be reestablished. Server A and Server B may again successfully communicate. After DCN connectivity is re-established, at the next runtime check interval, e.g., at time t=T+1, Server B may successfully contact Server A. Server A and Server B may both be in the Running state 940, 945 and Server A's state in Server B's cache may be set to Running 945. Server B may then decide whether to remain active or to go into Stand By mode based on Server A's response. This runtime status request may update Server B's runtime state in Server A's cached information to Unknown 940 and may cause Server A to check Server B's runtime status at the next check interval, e.g., at time t=T+2. As a result of Server A's request for Server B's runtime status, Server A's runtime status in Server B's cache may be set to Unknown 955. The runtime status of both Server A and Server B may remain at Running 950, 955. Server A may then decide whether to remain active or to go into Stand By mode, according to Server B's response.

If Server B remains active, then Server A may go into Stand By state and Server B may become the only active server in the network. For example, at time t=T+3, Server A may transition to the Stand By state 960 and Server B may remain in the Running State 965. Both servers' caches may remain unchanged, set at Unknown 960, 965. Server B may request Server A's runtime status at its next query interval, e.g., at time t=T+4. As a result of this request, Server B's runtime state in Server A's cache, may be set to (i.e., remain at) Unknown 970 and Server A's runtime state in Server B's cache may be set to Stand By 975. In the Stand By state, Server A may not request Server B's runtime status, therefore, Server B's runtime state in Server A's cache may remain set to Unknown 970.

Figure 10:
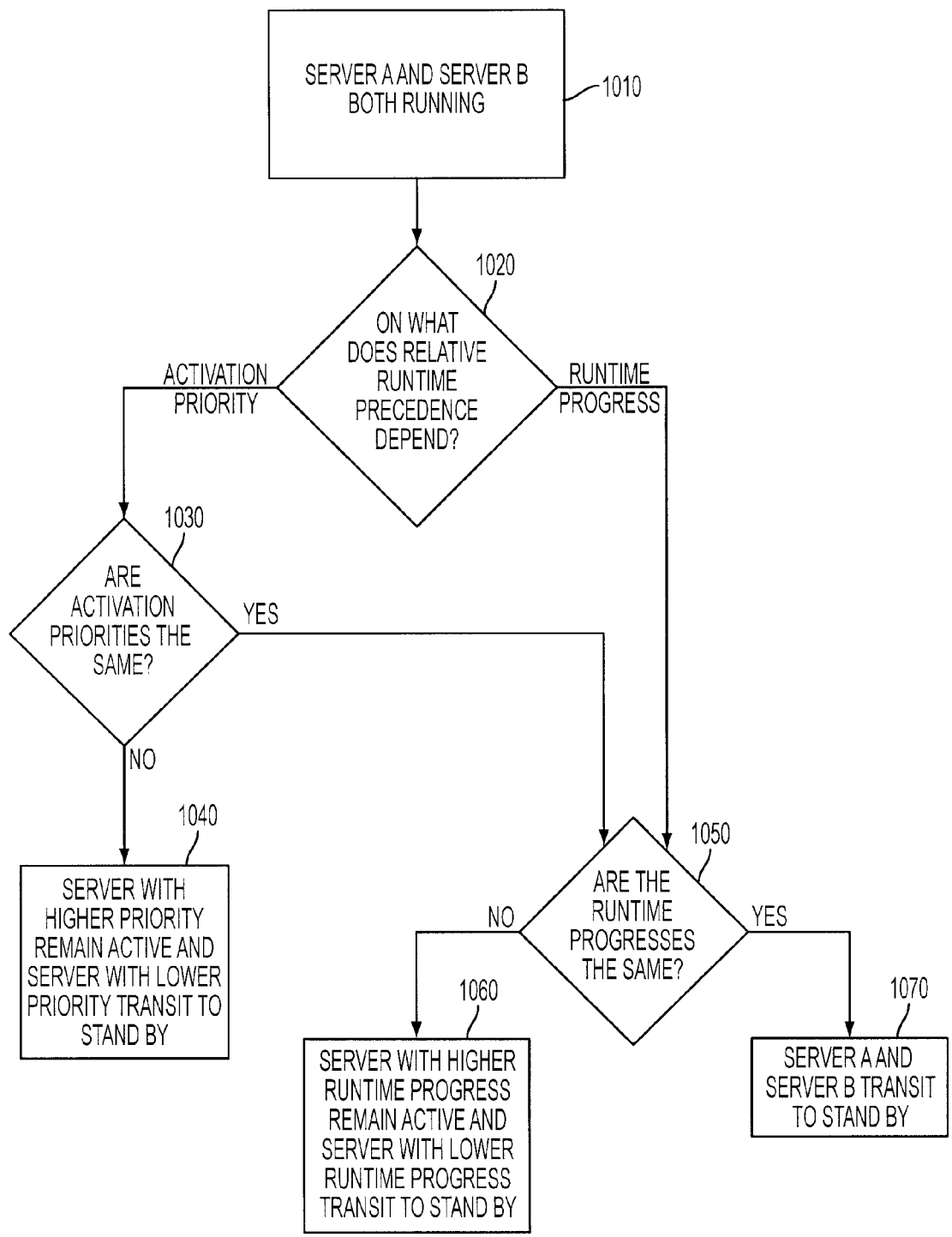
FIG. 10 is a flowchart illustrating determination of runtime precedence between two active NMS servers consistent with the present disclosure.

Referring to FIG. 10, since both Server A and Server B are in the Running state 1010, the decision to go into Stand By mode may depend on the relative runtime precedence of the servers 1020. If the runtime precedence depends on runtime progress then the NMS instance that will remain active may be determined according to the relative progress of each NMS instance 1050, i.e., how many WSF clients each one is servicing and, ultimately, the activation priority of each server. If the runtime precedence depends on activation priority 1030, then the server with highest priority may remain active 1040. If both servers have the same activation priority then the server with highest runtime progress may remain active 1060. If both servers have the same runtime progress, then both may transit to Stand By state 1070 and one of them may be re-activated by a WSF client.

Configuration management may be achieved when the EMS-NMS servers "sew" the EMS separately discovered termination points into the appropriate network trails. This sewing may occur anytime a new NMS server becomes active or any time a user forces a rediscovery of the network, e.g., using a GUI panel.

Figure 11:
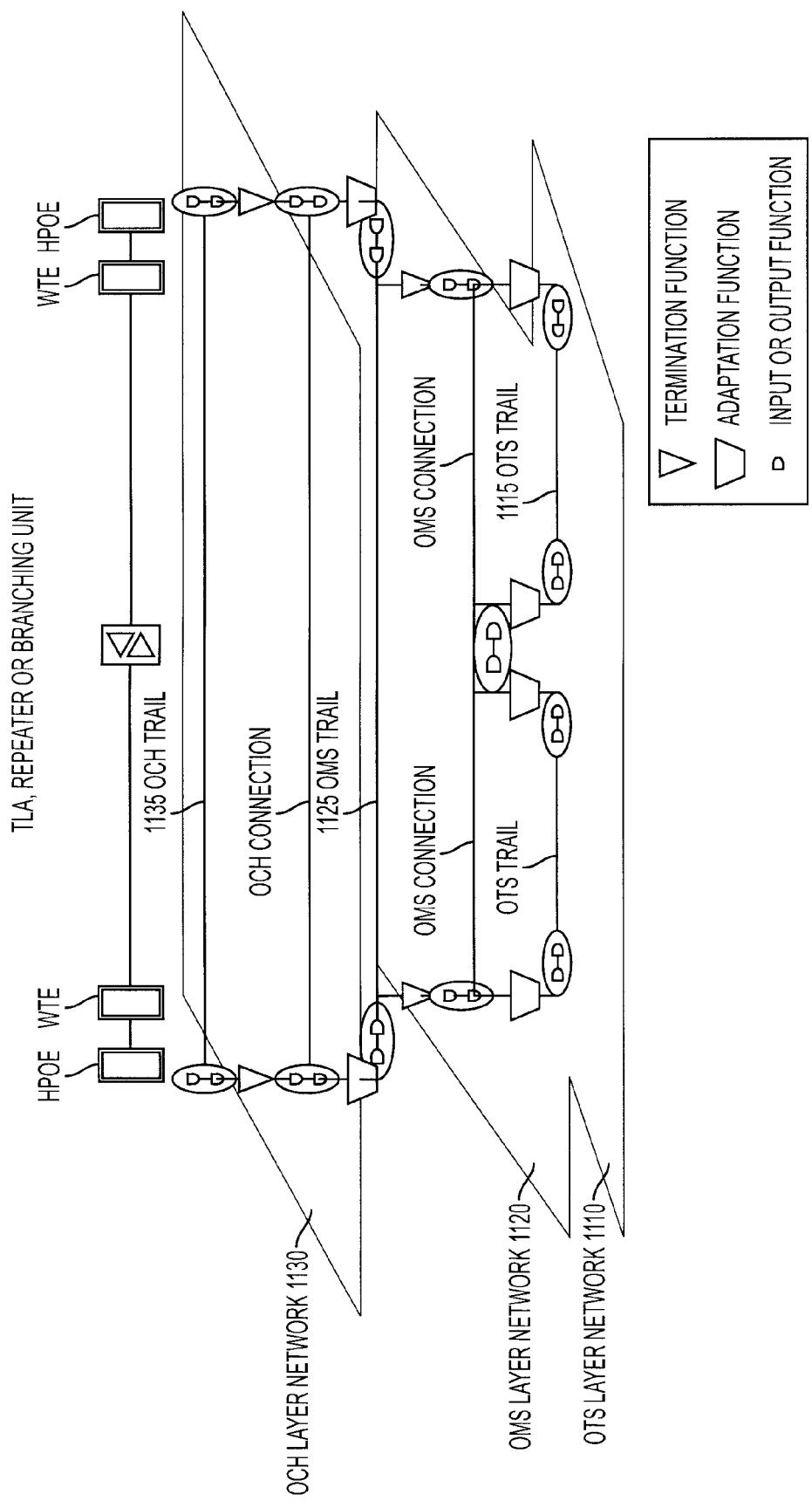
FIG. 11 depicts optical transport layer networks consistent with the present disclosure.

FIG. 11 depicts a high-level view of layers of a distributed network, e.g., an undersea fiber optic network. The distributed network may include three layers. A first layer may be an optical transmission section (OTS) layer 1110. The OTS layer 1110 may include optical fibers and their interconnections. A second layer may be an optical multiplex section (OMS) layer 1120. The OMS layer 1120 may include multiplexed channels of optical signals. A third layer may be an optical channel (OCH) layer 1130.

A layer may include one or more trails. A trail may include one or more connections and at least one termination point. For example, an OCH trail 1135 may include two terminations and a channel connecting them. An OMS trail 1125 may be formed by linking in a sequence, one or more OMS connections. An OMS connection may be supported by an OTS trail 1115 which may correspond to a physical link, e.g., a fiber.

A NMS function (e.g., NMS 54) may achieve dynamic trail generation by discovering termination points and their connectivity pointers and then combining/sewing the termination points and their connectivity pointers into appropriate network trails. Discovery and sewing may be performed in real time and may take only a few minutes for relatively large systems. Trail generation and trail inventory information may be used by both a fault management feature, e.g., fault manager component 618 and a performance management feature, e.g., performance manager component 616.

A WSF configuration management feature may support user designation of customer names, notes, etc., that may be associated with OCH trails, e.g., OCH trail 1135. An EMS function resident on a EMS-NMS hardware server may maintain a database of equipment inventory. An NMS function, e.g., NMS 54, may retrieve and store information from an EMS, e.g., EMS 50-1, function via a northbound interface, e.g., NBI 52-1. By assigning customer names in accordance with the transport system, operators may relatively quickly and visually relate EMS-NMS alarm reports to those generated by the transport system NMS to help in manually correlating potential transport faults with undersea faults.

Figure 12:
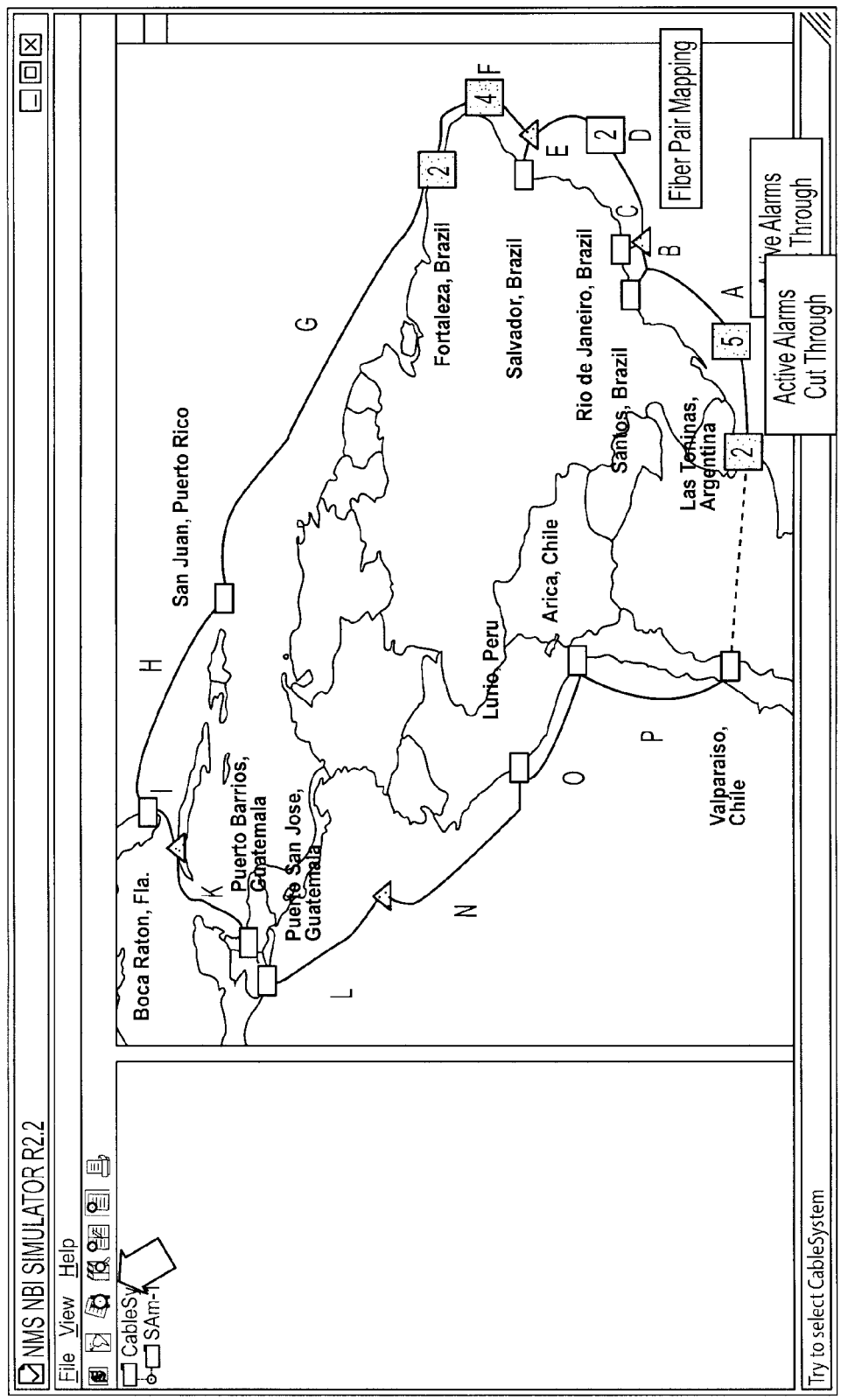
FIG. 12 is an illustration of a GUI for one exemplary workstation function consistent with the present disclosure.
Figure 13:
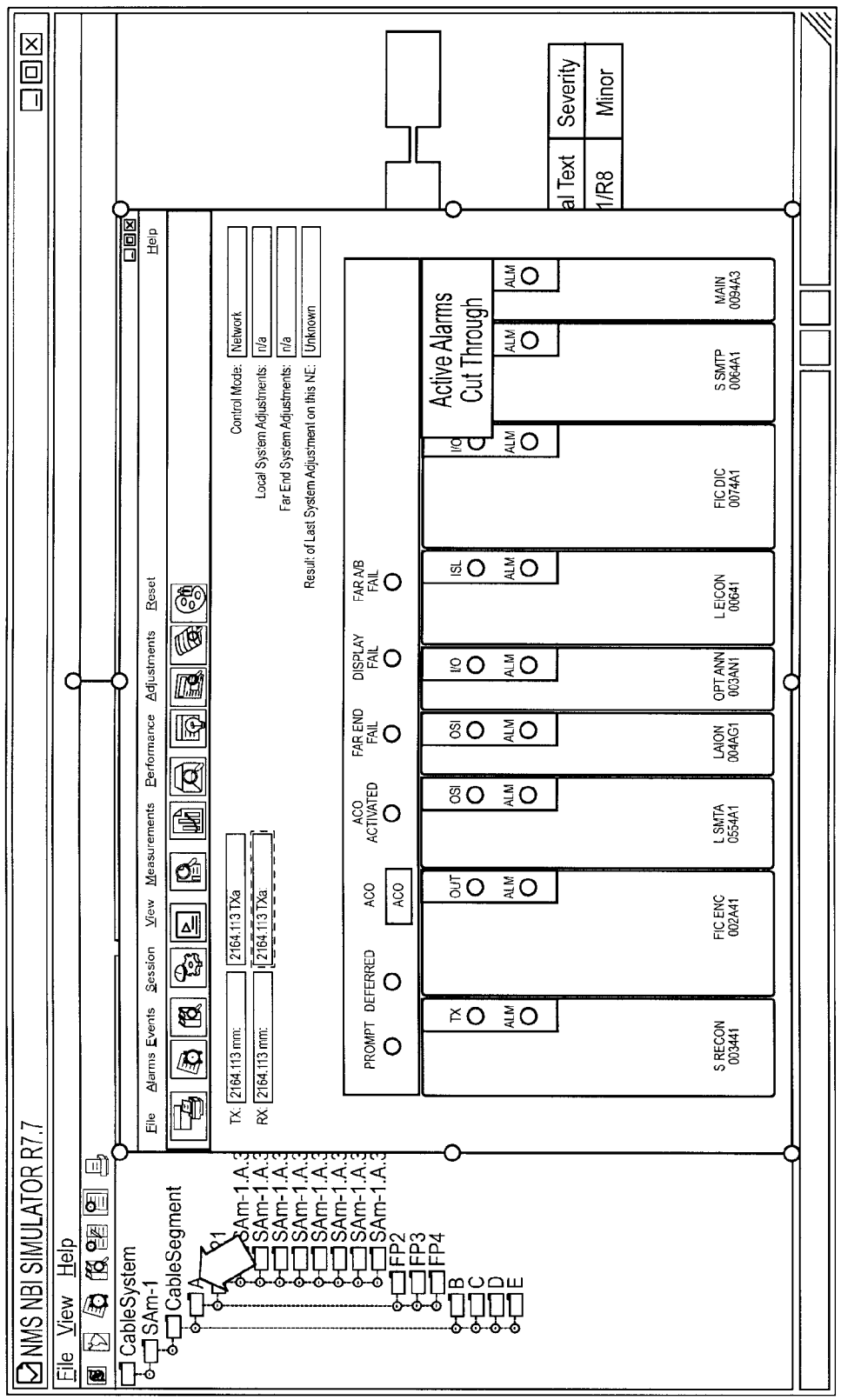
FIG. 13 is an illustration of a GUI for a workstation function showing an example of a unit view of a network element consistent with the present disclosure.

Fault or Alarm management for a managed network may be achieved by automatic event notification, including alarm synchronization, from each of the EMS functions via an NBI, e.g., NBI 52-1. In this architecture, reported alarms may include NMS system alarms (for example faulty hard drives, CPU alarms, DCN alarms, etc.). Thus, fault management may include fault management of the management system itself. The NMS function may maintain a real-time copy of a network's active alarm list, and may provide each registered client (e.g., WSF) with automatic updates. Alarms that may affect traffic may be associated with one or more trails. A WSF client may scope and filter alarms locally, without issuing NMS function queries, which may not increase DCN traffic. Active alarms may be listed either in a tabular form or indicated on a main network topological schematic (e.g., as shown in FIG. 12) at an originating location (e.g., monitored cable stations or segments). FIG. 13 depicts an example of a view that may be available to a user WSF. This view includes a "cut-through" that may enable user access to information on an equipment basis. Alarms identified by a Line Monitoring System (LMS) for undersea segments may also be included.

Colors may be used to designate the highest severity alarm being reported at the designated location.

Additional graphical trail views, based on user selected topological scopes, may also indicate alarm origination by location. This may allow a user to quickly determine the impact of equipment failures and potentially the common cause, possibly without the need for extended investigation. The active alarm list may also be used by a root-cause analysis (RCA) function.

The RCA function may, upon user request, analyze any current alarms within a specific scope and may determine parents or root causes. The RCA function may further provide potential corrective actions that may be based on accurate topology-based fault analysis. The RCA function may be designed for undersea cable network architectures, thus it may require no user configuration such as rules. However the means to define rules may be provided should a user, based on atypical network management policies or behavior, wish to identify new potential root causes or over-ride an automatic RCA algorithm. The RCA function may utilize managed network element (NE) behavioral models combined with a topological model of an undersea network to accurately arrive at possible root causes. The RCA function may consider both the temporal and spatial relationships of alarmed NEs, and may thereby efficiently filter unrelated alarms to minimize the plethora of alarmed events that may be presented to a user in the case of a complex network fault. These features may effectively eliminate the need to define rules on an equipment basis. The RCA feature may complement the other trail view mechanisms for quickly locating the root cause of undersea alarms. Depending on where in the trail hierarchy RCA may be initiated, appropriate scoping of the alarm information delivered to the RCA function may be automatically performed and may determine root causes at a desired network scope.

A performance management function may rely on trails created by the configuration management function discussed above, and may only activate upon request from a client WSF. The EMS function on a EMS-NMS server may maintain a database of historical data pertaining to managed network elements. Accordingly, there may be no need to duplicate the data in a persistent database associated with an NMS function. Instead, when a client (which may also include the EMS-NMS automatic PM report generator feature) requests a trail based report with optional filters and scoping, the hosting NMS server may initiate optimized database queries, via the NBI to the appropriate EMS functions only. These servers may maintain historical data for the equipment associated with the trail. Performance management and query responses may be optimized to minimize NMS DCN traffic. This paradigm may provide WSF responses within seconds.

Embodiments of the distributed network management system and method, e.g. the NMS and EMS functions of a EMS-NMS server, can be implemented as a computer program product for use with a computer system. Such implementations include, without limitation, a series of computer instructions that embody all or part of the functionality previously described herein with respect to the system and method. The series of computer instructions may be stored in any machine-readable medium, such as semiconductor, magnetic, optical or other memory devices, and may be transmitted using any communications technology, such as optical, infrared, microwave, or other transmission technologies. It is expected that such a computer program product may be distributed as a removable machine-readable medium (e.g., a diskette, CD-ROM), preloaded with a computer system (e.g., on system ROM or fixed disk), or distributed from a server or electronic bulletin board over the network (e.g., the Internet or World Wide Web).

Those skilled in the art should appreciate that such computer instructions can be written in a number of programming languages for use with many computer architectures or operating systems. For example, preferred embodiments may be implemented in a procedural programming language (e.g., "C") or an object oriented programming language (e.g., "C++" or Java). Alternative embodiments consistent with the present disclosure may be implemented as pre-programmed hardware elements, firmware or as a combination of hardware, software and firmware.

Accordingly, using a distributed network management system and method allows data to be shared between servers in a network while minimizing reliance on one server. The distributed messaging may also reduce traffic flow and eliminate system bottlenecks.

According to one aspect of the disclosure, there is provided a distributed network management system including a plurality servers, each of the plurality of servers including an element management system (EMS) function for managing network elements within the network and a network management system (NMS) function for managing ones of the plurality of servers running the EMS function. The plurality of servers are configured to ensure that the NMS function is active on one of the plurality of servers and inactive on the others of the plurality of servers when the plurality of servers share one network domain. When the network domain is separated into multiple domains, the plurality of servers are configured to automatically activate the NMS function on one of the plurality of servers associated with each of the multiple domains and ensure that the NMS function on the others of the servers including each of the plurality of network domains is inactive.

According to another aspect of the disclosure, there is provided a method of managing a network including providing on each of a plurality of servers an element management system (EMS) function for managing network elements within the network and a network management system (NMS) function for managing ones of the plurality of servers running the EMS function; activating the NMS function on one of the servers when the plurality of servers share a one network domain; and activating the NMS function automatically on at least one other one of the plurality of servers when the one network domain is divided into multiple network domains, whereby each of the multiple network domains has at least one associated active NMS function.

According to another aspect of the disclosure, there is provided a method of assigning a host server in a distributed network management system including a plurality of servers, each of the plurality of servers including an element management system (EMS) function for managing network elements within the network and a NMS function for managing ones of the plurality of servers running the EMS function, the method including: operating a first one of the plurality of servers for requesting runtime status of an NMS function of a remote one of the plurality of servers; receiving a response from the remote one of the servers; comparing runtime status of the first one of the plurality of servers to the runtime status of the remote one of the servers; and initializing the first one as a host server in response to the comparing runtime status.

According to yet another aspect of the disclosure, there is provided a machine-readable medium whose contents cause a computer system to perform a method of assigning a host server in a distributed network management system including a plurality of servers, each of the plurality of servers including an element management system (EMS) function for managing network elements within the network and a NMS function for managing ones of the plurality of servers running the EMS function, the method including: operating a first one of the plurality of servers for requesting runtime status of an NMS function of a remote one of the plurality of servers; receiving a response from the remote one of the servers; comparing runtime status of the first one of the plurality of servers to the runtime status of the remote one of the servers; and initializing the first one as a host server in response to the comparing runtime status.

While principles consistent with the present disclosure have been described herein, it is to be understood by those skilled in the art that this description is made only by way of example and not as a limitation as to the scope of the present disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A distributed network management system comprising:
   a plurality of servers, each of said plurality of servers comprising an element management system (EMS) function for receiving network status data from network elements within the network for managing the network elements and a network management system (NMS) function for receiving messages from each of said EMS functions for managing said plurality of servers,
   said plurality of servers being configured to ensure that said EMS function is active on all of said servers and said NMS function is also active on one of said plurality of servers and inactive on the others of said plurality of servers when said plurality of servers share one network domain, whereby said EMS and said NMS function are both active on said one of said plurality of servers and only said EMS function is active on said others of said plurality of servers, and when said one network domain is separated into first and second separate domains said plurality of servers being configured to ensure that said EMS function is active on all of said servers and to automatically also activate said NMS function on a first one of said plurality of servers associated said first domain and a second one of said plurality of servers associated with said second domain, whereby each of said first and second separate domains has a separate associated one of said plurality of servers performing said NMS function, and ensure that said NMS function on the others of said servers comprising said first and second separate domains is inactive, and
   when said first and second separate domains are re-combined into said one network domain,
   said first and second ones of said plurality of servers being configured to automatically request each other's runtime precedence, wherein the server with the lowest activation priority or the lowest runtime progress relinquishes NMS functionality, and when both servers have the same activation priority, the servers comparing runtime progress to determine which server should relinquish NMS functionality.

2. A system according to claim 1, wherein said NMS function is configured to automatically discover a network topology of a domain in which said NMS function is active.

3. A system according to claim 1, wherein said plurality of servers do not maintain a persistent database of network information for use by said NMS function.

4. A system according to claim 1, wherein said NMS function is configured to automatically discover termination points in a domain in which said NMS function is active and connect said termination points to establish network trails for said domain in which said NMS function is active.

5. A system according to claim 4, wherein said NMS function is configured to perform fault management for said network using said network trails.

6. A system according to claim 1, wherein each of said plurality of servers further comprises a client workstation function (WSF) for displaying status of said network to a user.

7. A method of managing a network comprising:
   providing on each of a plurality of servers an element management system (EMS) function for receiving network status data from network elements within the network for managing the network elements and a network management system (NMS) function for receiving messages from each of said EMS functions for managing said plurality of servers;
   activating said EMS function on all of said servers and also activating said NMS function on one of said servers when said plurality of servers share a one network domain, whereby said EMS and said NMS function are both active on said one of said plurality of servers and only said EMS function is active on all others of said plurality of servers; and
   activating said NMS function automatically on at least one other one of said plurality of servers when said one network domain is divided into multiple separate network domains, whereby each of said multiple separate network domains has a separate associated active NMS function;
   comparing runtime precedence of said one of said servers and said at least one other one of said plurality of servers to automatically elect a single host server with said NMS function active thereon when said multiple domains are re-combined into said one network domain, wherein the server with the lowest activation priority or the lowest runtime progress relinquishes NMS functionality, and when both servers have the same activation priority, runtime progress is compared to determine which server should relinquish NMS functionality.

8. A method according to claim 7, said method further comprising discovering automatically a network topology in one of said servers where said NMS function is active.

9. A method according to claim 7, said method further comprising discovering automatically termination points in one of said servers where said NMS function is active and connecting said termination points to establish network trails.

10. A method according to claim 9, said method further comprising performing fault management for said network using said network trails.

11. A method according to claim 7, said method further comprising providing on each of said plurality of servers a client workstation function (WSF) for displaying status of said network to a user.

12. A method of assigning a host server in a distributed network management system including a plurality of servers, each of said plurality of servers comprising an element management system (EMS) function for receiving network status data from network elements within the network for managing the network elements and a network management system (NMS) function for receiving messages from each of said EMS functions for managing each server running said EMS function, all of said plurality of servers performing said EMS function and a first one of said plurality of servers also performing a first NMS function for a first domain in said distributed network management system, said first domain having been separated from a single domain, whereby said EMS and said NMS function are both active on said first one of said plurality of servers and only said EMS function is active on all others of said plurality of servers in said first domain, and a second one of said plurality of servers also performing a second NMS function for a second domain in said distributed network management system, said second domain having been separated from said single domain with said second one of said plurality of servers having been automatically activated when said second domain was separated from said single domain, whereby said EMS and said NMS function are both active on said second one of said plurality of servers and only said EMS function is active on all others of said plurality of servers in said second domain, said first domain being separate from said second domain, said method comprising, after said first and second domains are re-combined into a said single domain:
- operating said first one of said plurality of servers for automatically requesting runtime status of said second one of said plurality of servers;
- receiving a response from said second one of said plurality of servers;
- comparing runtime status of said first one of said plurality of servers to said runtime status of said second one of said plurality of servers;
- initializing said first one as a host server of said single domain automatically in response to said comparing runtime status; and
- deactivating said NMS function on said second one of said plurality of servers automatically in response to said comparing runtime precedence, wherein the server with the lowest activation priority or the lowest runtime progress relinquishes NMS functionality, and when both servers have the same activation priority, runtime progress is compared to determine which server should relinquish NMS functionality.

13. A method according to claim 12, said method further comprising discovering automatically a network topology associated with said plurality of servers.

14. A method according to claim 12, said method further comprising discovering automatically termination points associated with said plurality of servers and connecting said termination points to establish network trails.

15. A method according to claim 14, said method further comprising performing fault management for said network using said network trails.

16. A non-transitory machine-readable medium whose contents cause a computer system to perform a method of assigning a host server in a distributed network management system including a plurality of servers, each of said plurality of servers comprising an element management system (EMS) function for receiving network status data from network elements within the network for managing the network elements and a network management system (NMS) function for receiving messages from each of said EMS functions for managing each server running said EMS function, all of said plurality of servers performing said EMS function and a first one of said plurality of servers also performing a first NMS function for a first domain in said distributed network management system, said first domain having been separated from a single domain, whereby said EMS and said NMS function are both active on said first one of said plurality of servers and only said EMS function is active on all others of said plurality of servers in said first domain, and a second one of said plurality of servers also performing a second NMS function for a second domain in said distributed network management system, said second domain having been separated from said single domain with said second one of said plurality of servers having been automatically activated when said second domain was separated from said single domain, whereby said EMS and said NMS function are both active on said second one of said plurality of servers and only said EMS function is active on all others of said plurality of servers in said second domain, said first domain being separate from said second domain, said method comprising, after said first and second domains are re-combined into a said single domain:
- operating said first one of said plurality of servers for automatically requesting runtime status of said second one of said plurality of servers;
- receiving a response from said second one of said plurality of servers;
- comparing runtime status of said first one of said plurality of servers to said runtime status of said second one of said plurality of servers;
- initializing said first one as a host server of said single domain automatically in response to said comparing runtime status; and
- deactivating said NMS function on said second one of said plurality of servers automatically in response to said comparing runtime precedence, wherein the server with the lowest activation priority or the lowest runtime progress relinquishes NMS functionality, and when both servers have the same activation priority, runtime progress is compared to determine which server should relinquish NMS functionality.

17. A non-transitory machine readable medium according to claim 16, said method further comprising discovering automatically a network topology associated with said plurality of servers.

18. A non-transitory machine readable medium according to claim 16, said method further comprising discovering automatically termination points associated with said plurality of servers and connecting said termination points to establish network trails.

19. A non-transitory machine readable medium according to claim 18, said method further comprising performing fault management for said network using said network trails.

* * * * *